US012260363B2

(12) United States Patent
Minter et al.

(10) Patent No.: US 12,260,363 B2
(45) Date of Patent: Mar. 25, 2025

(54) DETERMINING A COACHING EFFECTIVENESS OF COACHES THAT ARE DEVELOPING EMPLOYEES

(71) Applicant: AmplifAI, Plano, TX (US)

(72) Inventors: Vishal Sean Minter, Highland Village, TX (US); Sreedhar Mylavarapu, Suskin, FL (US)

(73) Assignee: AmplifAI Solutions Inc., Plano, TX (US)

( * ) Notice: Subject to any disclaimer, the term of this patent is extended or adjusted under 35 U.S.C. 154(b) by 491 days.

(21) Appl. No.: 17/697,854

(22) Filed: Mar. 17, 2022

(65) Prior Publication Data

US 2022/0245559 A1  Aug. 4, 2022

Related U.S. Application Data

(63) Continuation-in-part of application No. 17/539,576, filed on Dec. 1, 2021, now Pat. No. 11,978,003, which is a continuation-in-part of application No. 17/162,469, filed on Jan. 29, 2021, now Pat. No. 11,790,303.

(51) Int. Cl.
    *G06Q 10/00* (2023.01)
    *G06Q 10/0639* (2023.01)
    *G06Q 30/00* (2023.01)
    *G06Q 30/0201* (2023.01)

(52) U.S. Cl.
    CPC ... *G06Q 10/06398* (2013.01); *G06Q 30/0201* (2013.01)

(58) Field of Classification Search
    CPC .......................................... G06Q 10/00–50/00
    USPC ....................................................... 705/7.29
    See application file for complete search history.

(56) References Cited

U.S. PATENT DOCUMENTS

| 11,336,770 B2* | 5/2022 | Danson | H04M 3/5175 |
| 2005/0192831 A1* | 9/2005 | Ellison | G06Q 10/06398 |
| | | | 705/345 |
| 2010/0114672 A1* | 5/2010 | Klaus | G09B 7/00 |
| | | | 705/7.14 |
| 2013/0111363 A1* | 5/2013 | Linton | H04L 12/1831 |
| | | | 715/753 |

(Continued)

*Primary Examiner* — Mustafa Iqbal
(74) *Attorney, Agent, or Firm* — Shiv S. Naimpally; Flagship Patents (57) ABSTRACT

In some examples, a server determines, based on aggregated data, metrics associated with an employee. The aggregated data includes activities performed by the employee using a computing device. The server determines, based on the metrics, a unified metric associated with the employee. The server determines a distribution curve based on the unified metric associated with the employee and additional unified metrics associated with additional employees and determines a location of the employee on the distribution curve. The server predicts, using multiple artificial intelligence engines, a next best action to improve a future performance of the employee. The server determines, a predetermined time interval after the particular data, a second unified metric associated with the employee. If the second unified metric is greater than the first unified metric, the server determines that the coaching session was successful and increases a coaching effectiveness metric associated with the coach.

20 Claims, 6 Drawing Sheets

(56) References Cited

U.S. PATENT DOCUMENTS

| | | | |
|---|---|---|---|
| 2016/0148330 A1* | 5/2016 | Roman | G09B 7/02 |
| | | | 705/326 |
| 2016/0275431 A1* | 9/2016 | Gouvernel | G06Q 10/06393 |
| 2017/0193397 A1* | 7/2017 | Kottha | G06F 40/30 |
| 2021/0264900 A1* | 8/2021 | Reece | G06F 3/167 |

* cited by examiner

DETERMINING A COACHING EFFECTIVENESS OF COACHES THAT ARE DEVELOPING EMPLOYEES

CROSS-REFERENCE TO RELATED APPLICATIONS

The present patent application is a continuation-in-part of U.S. patent application Ser. No. 17/539,576 filed Dec. 1, 2021, which is a continuation-in-part of U.S. patent application Ser. No. 17/162,469 filed Jan. 29, 2021, both of which are incorporated by reference herein in their entirety and for all purposes as if completely and fully set forth herein.

BACKGROUND OF THE INVENTION

Field of the Invention

This invention relates generally to a system to analyze employee actions, determine, using artificial intelligence (AI), a development plan including coaching (e.g., a one-on-one live or video conference between an employee and a supervisor) as part of the professional development of employees, and determine an effectiveness of the coaching.

Description of the Related Art

When employees in a corporation ("enterprise") are performing similar tasks, such as customer service-related tasks (e.g., help desk), the corporation may desire to identify and improve employees. However, identifying employees whose performance needs improvement, determining which specific areas each employee needs to improve upon, and determining how to address those specific areas is a complex task. One of the tools an organization may use to improve an employee's performance is to have a supervisor provide coaching to an employee. However, the organization typically has no idea as to an effectiveness of the supervisor as a coach.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server determines, based on a portion of aggregated data, a plurality of metrics associated with an employee. The aggregated data includes activities performed by the employee using a computing device. The server determines, based on the plurality of metrics, a unified metric associated with the employee. The server determines a distribution curve based on the unified metric associated with the employee and based on additional unified metrics associated with additional employees. The server determines a location of the employee on the distribution curve. The server predicts, using a plurality of artificial intelligence engines executing on the server and based on the location of the employee on the distribution curve, a next best action for the employee and sends the next best action to the employee and to a supervisor of the employee to improve a future performance of the employee. The server determines, a predetermined time interval after the particular data, a second unified metric associated with the employee. Based at least in part on determining that the second unified metric is greater than the first unified metric, the server determines that the coaching session was successful and increases a coaching effectiveness metric associated with the coach.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

U.S. patent application Ser. No. 17/162,469 describes systems and processes to enable detection of metrics, actions or both and automatically deliver actions, such as coaching and automated learning, to target result effective variables to change future outcomes. A result effective variable may be characterized as a variable with a causal link to other variables or a variable that precipitates changes in other variables, metrics, or outcomes. These systems and processes may be powered by multiple types of machine learning to identify the result effective variables, generate target metrics, and automate actions to be taken based on a variance of actual metrics from the target metrics. The systems and processes may be adaptive to the needs, goals, and selected machine learning methodology and may be adaptive to employee psychology, employee experience, and customer base.

The systems and techniques described herein determine an effectiveness of coaching provided by individual coaches in an organization. For example, multiple artificial intelligence (AI) engines may be used to determine a next best action (NBA) for each employee based on comparing a previously predicted performance with actual performance and based on predicting future performance. For example, the NBA may take into account (i) particular goals and priorities set by a sub-division of an enterprise, (ii) a score associated with individual employees based on their performance in a particular time period (e.g., X days, X>0) relative to the goals and priorities, (iii) how individual employee performance differs relative to composites, referred to as personas, that are based on exemplary employees, (iv) the predicted performance of individual employees, (v) where individual employees are located on a distribution curve that includes the scores of multiple employees, other factors, or any combination thereof. A persona is a consolidated metric based on a set of (e.g., one or more) high performing employees. For example, for a particular metric, those employees that score highly for the particular metric may be grouped together in a set and a persona created based on the set of high performing employees. The persona may be an average, a weighted average, a median, or another type of calculated value that is determined based on the set of high performing employees. In some cases, the persona may be determined based on selecting high performing employees for each particular metric. A persona variance is the difference, on a distribution curve, between (1) where a particular employee is located based on the employee's current performance, and (2) where the persona is located on the distribution curve. The NBA may be designed to improve the predicted future performance. For example, if one or more AI engines predict a particular performance for an employee based on the employee's actions during a particular time period, the AI engines may determine the NBA to improve the employee's performance.

The NBA may include a coaching session between an employee and a supervisor. A supervisor is anyone having a higher position than the person that the supervisor is coaching. For example, a manager may coach a member of his team, a director may coach a manager that reports to him, and so on. The term coaching or coaching session refers to a period of time (e.g., 15, 30, 45, or 60 minutes) during which a supervisor and an employee discuss ways in which the employee's performance can be improved. The coaching session may be in-person or via video conferencing or audio conferencing. At least one supervisor and at least one employee are present in a coaching session. While a one-on-one session (e.g., one employee and one supervisor) may be preferred, in some cases more than one employee may be present. For example, if more multiple employees (e.g., more than one) are identified as benefitting from the same training, then one supervisor may train multiple employees. In some cases, if the coaching includes multiple topics, a first supervisor may coach one topic while a second supervisor coaches a second (e.g., related) topic.

The coaching session may include listening to a previously recorded call during which the supervisor comments on what the employee could have done differently to achieve a more desirable outcome. The previously recorded call may be between the employee undergoing coaching and a customer or between another employee (e.g., an exemplary employee) and a customer. The coaching session may include role-playing in which the employee plays one role (e.g., employee or customer) and the supervisor plays the other role (e.g., customer or employee). The systems and techniques described herein determine the effectiveness of coaching by quantifying the improvement in employee performance before and after the coaching.

As an example, a server may include one or more processors and a memory to store instructions executable by the one or more processors to perform various operations. For example, the operations include determining, based on a portion of aggregated data, a plurality of metrics associated with an employee. The aggregated data includes activities performed by the employee using a computing device. The operations include determining, based on the plurality of metrics, a first unified metric associated with the employee. The operations include creating a distribution curve based on the first unified metric associated with the employee and based on additional unified metrics associated with additional employees. The operations include determining a location of the employee on the distribution curve. The operations include predicting, by a plurality artificial intelligence engines (executing on the server) and based on the location of the employee on the distribution curve, a next best action for the employee. Based on determining that the next best action comprises coaching, determining that a coaching session between the employee and a coach took place on a particular date and determining, a predetermined time interval after the particular data, a second unified metric associated with the employee. The operations include, based at least in part on determining that the second unified metric is greater than the first unified metric: (1) determining that the coaching session was successful, and (2) increasing a coaching effectiveness metric associated with the coach. The coaching effectiveness metric is determined by dividing a number of successful coaching sessions with a total number of coaching sessions performed by the coach in the predetermined time interval. Based at least in part on determining that the second unified metric is less than or equal to the first unified metric, the server determines that the coaching session was unsuccessful, and decreases a coaching effectiveness metric associated with the coach. The server may display a user interface, display a plurality of groups, and, based at least in part on receiving a selection of a particular group of the plurality of groups, display a plurality of coaches belonging to the particular group. Based at least in part on receiving a selection of a particular coach of the plurality of coaches, the server may display (e.g., in the UI) a coaching effectiveness metric associated with the particular coach. The server may display a plurality of time intervals, receive a selection of a particular time interval of the plurality of time intervals, and determine the coaching effectiveness metric associated with the particular coach for the particular time interval. The server may predict, using the plurality artificial intelligence engines, a coaching next best action for the coach. For example, the coaching next best action may include one of: providing a nudge to the coach, scheduling training for the coach, scheduling coaching to the coach, or providing recognition to the coach.

Figure 1:
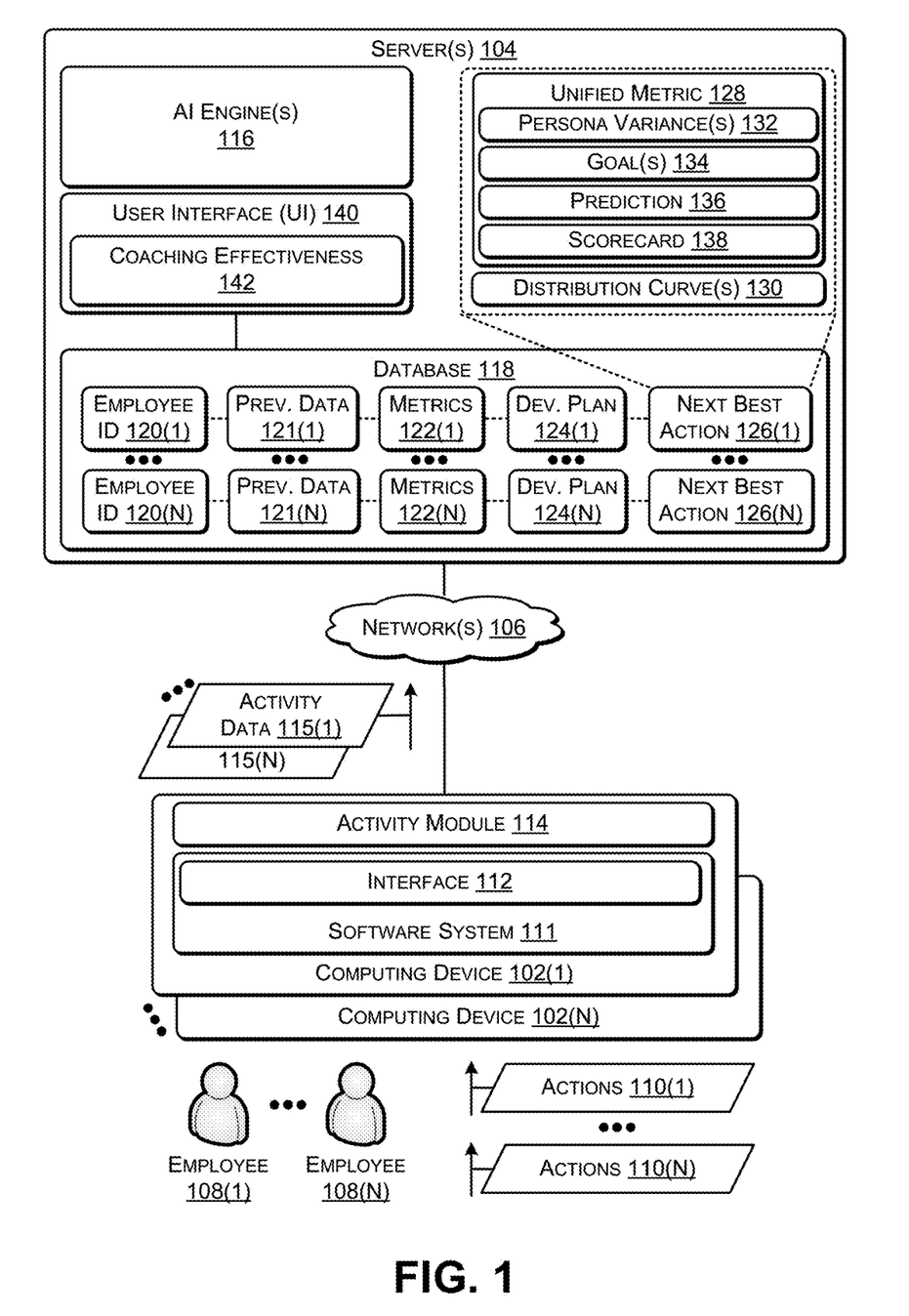
FIG. 1 is a block diagram of a system that includes a server to gather activity data associated with employees, according to some embodiments.

FIG. 1 is a block diagram of a system 100 that includes a server to gather activity data associated with employees, according to some embodiments. The system 100 includes multiple computing devices 102(1) to 102(N) (N>0) connected to one or more servers 104 via one or more networks 106.

Individual ones of the computing devices 102 may be associated with (e.g., used by) individual employees. For example, an employee 108(1) may be associated with the computing device 102(1) and an employee 108(N) may be associated with the computing device 102(N). Individual ones of the employees 108 may perform one or more actions using their associated computing device 102. For example, the employee 108(1) may perform actions 110(1) using the computing device 102(1) and the employee 108(N) may perform actions 110(N) using the computing device 102(N). The employees 108 may, in some cases, be associated with a particular group (e.g., line of business) and/or subgroup (department) within a corporation (e.g., an enterprise). For example, the employees 108 may be part of a customer facing group, such as sales, support, helpdesk, or the like.

Individual ones of the computing devices 102 may include a software system 111, such as, for example, a customer relationship management (CRM) system, a help desk system, or another type of software system. An activity module 114 may monitor the activities, such as the actions 110, performed by each of the employees 108 on each of the associated computing devices 102. In some cases, the activity module 114 may monitor the activities of the employees

108 by accessing an interface 112, such as an application programming interface (API) or the like, associated with the software system 111.

The activity module 114 that is executing on each of the computing devices 102 may send activity data 115 to the server 104 at a predetermined interval, based on determining that a particular event has occurred, or any combination thereof. For example, the activity module 114 may send the activity data 115 to the server 104 at a predetermined interval, such as, every M minutes (M>0), e.g., every hour (e.g., M=60), every M=1440 minutes (e.g., every day), or the like. The computing device 102(1) may send the activity data 115(1) and the computing device 102(N) may send the activity data 115(N). In some cases, the computing devices 102 may send the activity data 115 substantially in realtime.

The server 104 receives the activity data 115 from individual ones of the computing devices 102 and stores the activity data 115 in a database 118. The server 104 uses one or more artificial intelligence (AI) engines 116 to analyze the activity data 115. In some cases, the AI engines 116 may include up to 20 AI engines. The term AI engine refers to a particular type of machine learning algorithm. The server 104 may use multiple types of machine learning algorithms including, for example, supervised learning algorithms (e.g., classifier, regression, ensemble), unsupervised learning algorithms (e.g., apriori, association, K-means clustering, principal component analysis, dimensionality reduction), reinforcement learning, linear regression, logistic regression, classification and regression trees (CART), naive Bayes, Bayesian network, K-nearest neighbors, random forest, artificial neural network, decision tree, support vector machine (SVM), and the like.

Each of the employees 108 may have a corresponding employee identifier (ID). For example, the employee 108(1) may have an employee ID 120(1) and the employee 108(N) may have an employee ID 120(N). The server 104 may store the activity data 115 with previously gathered data 121 and use the AI engines 116 to determine metrics 122 associated with each employee ID 120. For example, the previously gathered data 121 may be cumulative and may include the activity data 115 received over a longer period of time, such as a large portion of the employee's career working at the enterprise. For example, if the employee 108(N) has worked for X number of years at a particular company, the previously gathered data 121 may include the activity data 115 from at least a portion of those years. The AI engines 116 may analyze the previously gathered data 121 and the metrics 122 to determine a development plan 124, including a next best action 126, for individual ones of the employees 108.

The AI engines 116 may, based on the development plan 124, determine a next best action 126 for each employee ID 120, thereby determining a next action for the professional development of each of the employees 108. The AI engines 116 may determine the next best action 126 based on a unified metric 128 and a distribution curve 130. The unified metric 128 may be determined based on four factors: (i) persona variance 132, (ii) goals 134, (iii) a prediction 136, (iv) and a scorecard 138.

The scorecard 138 indicates how each employee 108 scores based on the employee's metrics 122 (e.g., including the activity data 115) relative to importance and/or weights provided by the enterprise. For example, the metrics 122 may include hundreds or even thousands of measurements associated with the actions 110. In a given time period, the enterprise may be focused on improving a portion (e.g., top 3, top 5, top 10 most important) of the metrics. The metrics that the enterprise selects as the most important may vary from one time period to another, e.g., from month to month, from quarter to quarter, from year to year, or the like. For example, in a first month, the enterprise may prioritize upselling an extended warranty to those calling into a global help desk. In a second month, the enterprise may prioritize the speed at which a caller's problem is resolved after calling the global help desk. In a third month, the enterprise may prioritize customer satisfaction, e.g., as measured by a survey. In a fourth month, the enterprise may prioritize reducing the number of handoffs between agents. A handoff occurs when a first agent transfers a call to a second agent, e.g., "I am going to put you on hold and transfer you to another agent in a different department". In addition, in a hierarchical organization, the scorecard 138 may be specific to a particular portion of the hierarchical organization. For example, the enterprise may have multiple lines of business (LOBs) and each particular LOB may have a particular set of metrics for their scorecard 138. In addition, each department within an LOB may set their own scorecard 138.

The persona variance 132 measures how each employee 108 ranks relative to other employees in a particular peer group. For example, the metrics 122 are used to determine the scorecard 138 for each employee 108. The employees 108 that are in a particular peer group (e.g., the enterprise may define multiple peer groups) are placed on one or more distribution curves 130 based on their respective scorecards 138.

The distribution curves 130 are used to identify top performing employees (also referred to as personas) and determine how far other employees are from the top performing employees. Based on each employee's scorecard 138, the employees 108 may be placed on one or more distribution curves 130. For example, each of the employees 108 may be scored on a particular aspect of their job based on the metrics 122, such as, for example, average time taken to resolve a customer issue, whether they handoff a customer to another employee and how often, customer satisfaction as a result of the solution presented by the employee, and the like. Each employee's score for a particular task may be placed on a distribution curve of the distribution curves 130. Each distribution curve 130 may be subdivided into two or more portions. For example, when a distribution curve is divided into three portions, a leftmost portion of the distribution curve may include below average performers, a middle portion of the distribution curve may include average performers, and a right portion of the distribution curve may include above average performers.

Each of the employees 108 may be evaluated using one or more distribution curves 130. For example, each of the distribution curves 130 may correspond to each of the goals 134. For a particular employee, the distance of the particular employee to a persona in a distribution curve is used to determine the development plan 124 and the next best action 126. For example, the next best action 126 for a particular employee may be designed to move the employee's position on the distribution curve towards the persona. The enterprise may set a threshold as to when to terminate an employee, such as an outlier (e.g., an employee that has below average performance on the distribution curve). For example, if an employee has not improved their position on the distribution curve after a particular period of time (e.g., Y days, Y>0), after the next best action 126 has failed to improve the employee's position on the distribution curve, or both, then the employee may be removed from the current peer group and either terminated or moved to a different peer group. To illustrate, the AI engines 116 may determine, based on the employee's metrics 122, that a particular employee is better suited for a sales group rather than a customer service group. As another example, an employee who is in the top ⅓ and is considered above average may still have room to improve and move towards the top-end of the distribution curve. With multiple distribution curves 130, the next best action 126 may be selected based on identifying which of the distribution curves 130 a particular employee has the greatest persona variance 132. For example, if there are five goals 134 and an employee is evaluated using five corresponding distribution curves 130, then the distribution curve where the employee has the largest persona variance 132 may be used to determine the next best action 126. To illustrate, the employee may be average in four of the five distribution curves 130 and below average in a particular one of the distribution curves 130. The distribution curve where the employee is below average may be used to select the next best action 126(N). As another illustration, the employee may be above average in four of the five distribution curves 130 and average in a particular one of the distribution curves 130. The distribution curve where the employee is average may be used to select the next best action 126(N). As yet another illustration, the employee may be above average in three of the five distribution curves 130 and average in two of the distribution curves 130. The distribution curve where the employee is the furthest from the persona may be used to select the next best action 126(N). Depending on where they are on a particular one of the distribution curves 130, the next best action 126 may be different for different people. For example, rather than wait for a supervisor to become available to coach an employee that is below average, the AI engines 116 may automatically schedule self-learning (e.g., on demand training) to improve the employee's performance as quickly as possible.

One or more managers in the enterprise may set the one or more goals 134. The goals 134 may be common for each peer group but may vary from one peer group to another peer group. Typically, a company-wide goal may be common to all peer groups while other goals may be set for each peer group within the context of the common goal. For example, a company goal may be "customer first" and how this is achieved may vary from one peer group to another. In some cases, one or more of the goals 134 may vary based on a number of years' experience, e.g., newly hired employees may have basic goals (e.g., on average, resolve a problem in Z minutes) while those that have been with the enterprise a longer time may have specific, detailed goals that require experience to achieve (e.g., on average, resolve a problem in half the time of the new hires, e.g., Z/2 minutes).

The prediction 136 may include predictions by the AI engines 116 on each of the employee's 108 predicted performance based on the metrics 122. For example, the AI engines 116 may receive the activity data 115 at the close of business on a particular day of the week (e.g., every Friday, every Saturday, every Sunday or the like) and predict employee performance for the next week based on a portion of the metrics 122 (e.g., data accumulated from the prior 2 months). The particular day of the week may be based on the start of the week and end of the week used by a particular business. The prediction 136 may be a predicted performance of the employee 108 that is used, along with other characteristics of the employee 108, to determine the next best action 126.

The persona variances 132, the goals 134, the prediction 136, and the scorecard 138 are used to create the unified metric 128. For example, the metrics 122 of an employee in a help desk may include an average handling time, first call resolution, and the like. Each metric of the metrics 122 may be normalized, e.g., scaled to be within a particular range, such as between 0.00 to 1.00, 0 to 100, or the like. For example, the average handling time may be measured in seconds and then normalized to be between 0 and 100, with 0 being the fastest and 100 being the longest time.

The development plan 124, the next best action 126, or both may include actions such as outlier nudge, micro-learning content, coaching sessions, recognition actions, and the like. A nudge is a method of communication that modifies the presentation of choices in a way that makes people more likely to pick the option that benefits them. For example, a conventional communication influences behavior by changing attitudes using persuasive information while a nudge targets behaviors through changes based on how choices are structured and/or communicated to an employee. The systems and techniques described herein use a nudge to cause an employee to select one or more actions that cause the employee to go from below average to average or from average to above average. Micro-learning content may be designed to address specific deficiencies identified by the analysis of the metrics 122. For example, an employee at a help desk may be poor in resolving issues associated with a particular operating system (e.g., Apple® iOS), but may be proficient in resolving issues associated with other operating systems (e.g., Android® and Windows®). In this example, the employee may be provided with micro-learning to improve the employee's handling of issues with the particular operating system. For each employee, the AI engines 116 may determine a largest persona variance 132 across all goals 134 to determine which area the employee needs the most improvement and predict the next best action 126 to move the employee to a next level (e.g., from below average to average, or from average to above average, barely above average to very near the persona.

Thus, even when two different employees have the same scorecard 138, each employee may have a plan that is uniquely tailored to their specific skills, strengths, and weaknesses. In addition, the AI engines 116 may identify, for some of the employees 108 (e.g., those who are above average or those who have made a significant improvement in terms of their position on the distribution curve 130), a positive reinforcement to encourage the employees above average performance or improvement in their position on the distribution curve 130. For example, the AI engines 116 may determine a next best action 126 for a particular employee. After a week, the AI engines 116 may analyze the activity data 115 and the metrics 122 and determine that the particular employee has made a significant improvement in their position on the distribution curve 130 by moving from below average to above average. In such a situation, the AI engines 116 may analyze the metrics 122 and the activity data 115 to determine a suitable positive reinforcement for the employee. For example, if the AI engines 116 determine that the employee responds to a particular type of reinforcement (e.g., a gift card for dinner), then the next best action 126 may include providing the employee with the particular type of reinforcement.

The server 104 may provide a user interface (UI) 140 that can be displayed on one or more of the computing devices 102. For example, one of the employees 108 may login to the UI 140 using credentials (e.g., username and password). After authenticating the credentials, the UI 140 may provide an appropriate level of access to portions of data in the database 118. For example, in a hierarchical organization, in which a chief executive officer (CEO) is at a highest level, a lowest level of the employees 108 may, after authentication, be unable to access data from the database 118 associated with coaching effectiveness 142. In some cases, a supervisor of the lowest level employee may be unable to access data from the database 118 associated with coaching effectiveness 142. However, those at a higher-level than the supervisor may, after having their credentials authenticated, be provided with access to the data associated with coaching effectiveness 142. The coaching effectiveness 142 may provide detailed information regarding how effective coaching has been to individual employees 108 (e.g., by quantifying the employee's improvement caused by undergoing coaching) and how effective each coach (e.g., supervisor) is with their coaching.

Thus, in an enterprise, an activity module on individual employee computing devices may gather activity data associated with actions performed by individual employees and send the activity data to a server. For example, the activity module may send the activity data one a particular day of the week (e.g., every Friday) for activities performed during the past week. The server may use artificial intelligence engines to analyze the activity data, as well as previously gathered activity data, to determine a score associated with how well individual employees are meeting or exceeding goals set by the enterprise. The server may identify where individual employees deviate the most from top performing employees (e.g., personas) and determine a next best action on how to improve individual employee's performance. In this way, below average employees may be provided with next best actions to improve their performance to average or above average, average employees may be provided with next best actions to improve their performance to above average, an above average employees may be provided with next best actions to stay above average or move higher along the distribution curve while remaining above average. The next best action may include training, micro-learning, positive reinforcement, on demand training, coaching via a peer, a manager, or a supervisor, or other type of action. The AI engines may learn how each employee can be improved. For example, in a first week the AI engines may determine a first next best action and, if the first next best action does not provide the predicted improvement in the employee's performance, then in a second week the AI engines may determine a second next best action, and so on. If the employee's performance does not improve after a certain number of next best actions, the employee may be flagged for termination or transfer to a different portion of the organization. If the employee's performance improves, the AI engines may identify what specific next best action was able to move the employee higher up the distribution curve. In this way, the AI engines may learn what next best actions are suitable for which type of employees in which portions (e.g., LOB, department, or the like) of the organization and which next best actions are not suitable. The AI engines may be periodically retrained using the data in the database 118 to further improve predictions. For example, the AI engines may be retrained every P months (P>0, P=1, 2, 3, and so on) to determine which next best actions have the most and least success.

Figure 2:
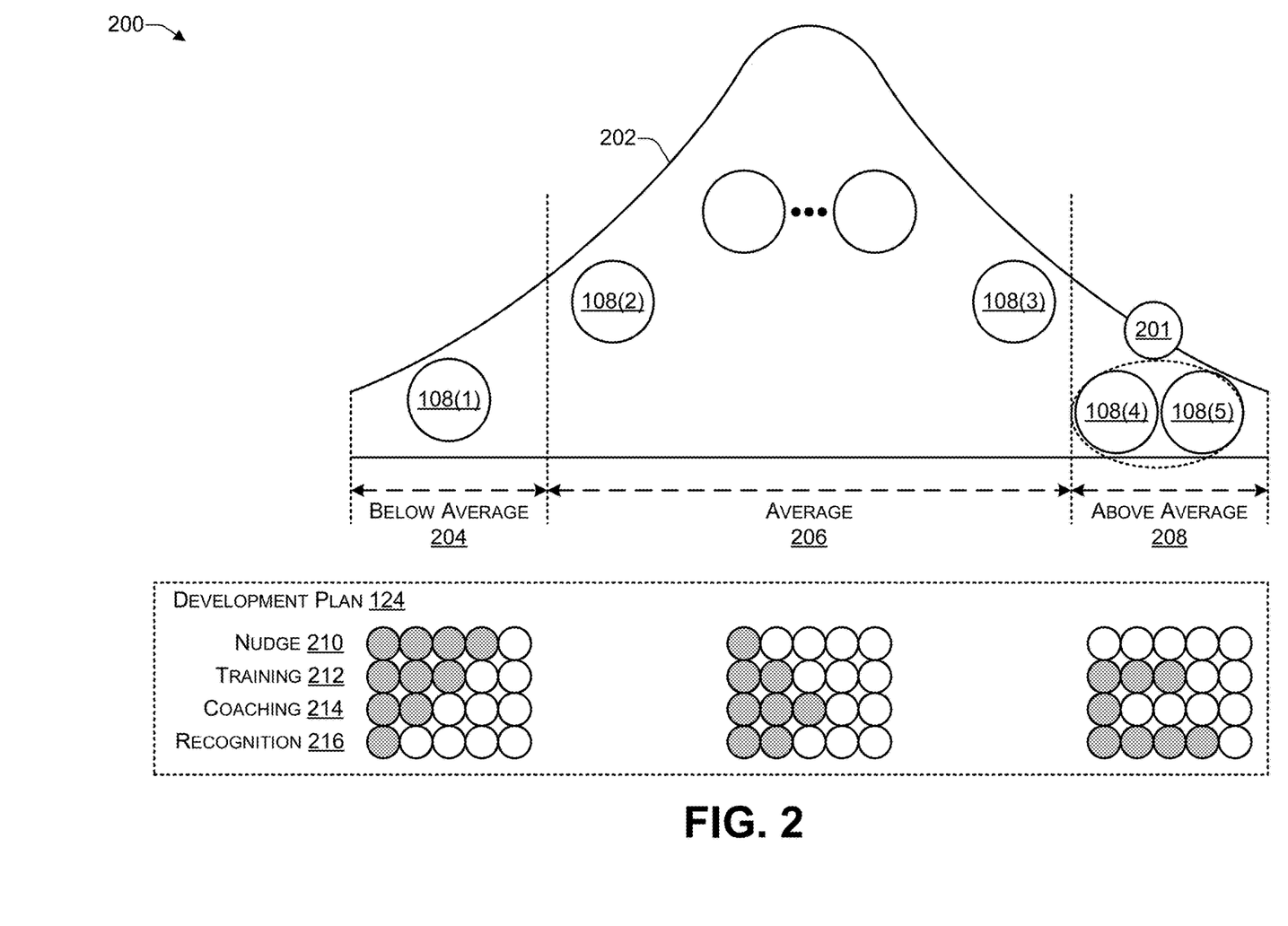
FIG. 2 is a diagram illustrating a distribution curve, according to some embodiments.

FIG. 2 is a diagram 200 illustrating a distribution curve 202, according to some embodiments. The distribution curve 202 may be created based on scorecards 138 of FIG. 1 associated with multiple of the employees 108 and displayed via the UI 140. The distribution curve 202 may be determined with respect to each of the goals 134. For example, if the enterprise sets six goals then six distribution curves may be created with the distribution curve 202 representing one of those six distribution curves.

The distribution curve 202 may be divided into two or more portions. For example, as illustrated in FIG. 2, the distribution curve 202 may be divided into three portions, low average 204, average 206, and above average 208. Of course, the distribution curve 202 may be divided into more than three portions. The employee 108(1) may belong to the below average 204.

The development plan 124 (including the next best action 126) for those in the below average 204 may include a nudge 210, training 212, coaching 214, and recognition 216. As illustrated in FIG. 2, a number (e.g., A>0)) of the employees in the below average portion 204 may be provided with some form of a nudge 210 to move them into the average 206. A smaller number (e.g., B<A) of the employees in the below average portion 204 may be provided with the training 212, such as on-demand training or micro-learning. Since the training 212 does not involve another person and can be delivered via a computing device, the training will 212 may be provided as quickly as possible to the employee. A still smaller number (e.g., C<B<A) of the employees in the below average portion 204 may be provided with the coaching 214 by scheduling a coaching session with a supervisor or manager. In some cases, a very few (e.g., D<C<B<A) of the employees in the below average portion 204 may be provided with recognition 216 (e.g., positive reinforcement). For example, if the employee 108(1) moves from the leftmost edge of the below average group 204 to the rightmost edge of the below average group 204, then in some cases, the employee 108(1) may be provided with recognition 216.

For a number (e.g., E>0) of employees in the average portion 206, the coaching 214 may be provided as part of the development plan 124. For a smaller number (e.g., F<E) of employees in the average portion 206, the training 212 or the recognition 216 may be provided as part of the development plan 124. For example, if the employee 108(2) moves from the leftmost edge of the average group 206 to the rightmost edge of the average group 206 (e.g., close to the employee 108(3)), then in some cases, the employee 108(1) may be provided with recognition 216. In some cases, a few (e.g., G<F<E) of the employees in the average portion 206 may be provided with the nudge 210.

For employees that are in the above average portion 208, many (e.g., H>0) of the employees will receive the recognition 216 (e.g., positive reinforcement). A fewer (e.g., I<H) number of employees in the above average portion 208 may be provided with the training 212 as part of their development plan 124. In some cases, a relatively smaller number (e.g., J<I<H) of employees in the above average portion 208 may be provided with the coaching 214. The goal with the development plan 124, for employees in the above average portion 208, may be to take them from the leftmost edge of the above average portion 208 (e.g., the employee 108(4)) to the rightmost portion of the above average portion 208, e.g., closer to a persona 201 of the distribution curve 202. The persona 201 may be determined based on a set of one or more above average 208 employees (e.g., high performing), such as, for example, the employees 108(4), 108(5).

The AI engines 116 of FIG. 1 may identify, based on the metrics 122, what type of development plan 124 causes the most desirable outcome for each employee 108. For example, a first employee may have a largest improvement when provided with the nudge 210, a second employee may have a largest improvement when provided with the training 212, a third employee may have a largest improvement when provided with the coaching 214, and a fourth employee may have the largest improvement when provided with the recognition 216. In addition, the AI engines 116 may determine, based on where an employee is on the distribution curve 202, which of the development plans 124 are predicted to provide the largest improvement. For example, employees in the below average portion 204 may have the largest improvement when provided with the nudge 210. Employees in the average portion 206 may have the largest improvement when provided with the coaching 214. Employees in the above average portion 208 may have the largest improvement when provided with the recognition 216. Thus, the AI engines 116 may determine the development plan 124 for a particular employee based on (1) which type of next best action (e.g., nudge 210, training 212, coaching 214, or recognition 216) creates the largest improvement in the particular employee and (2) where the particular employee is located on the distribution curve 202. The persona 201 (e.g., target) may be reverse engineered to determine a metric for an individual employee 108.

The distribution curve 202 is associated with one particular goal of multiple goals set by the enterprise (typically by a portion of the enterprise in a hierarchical organization, such as a line of business, section, department, or the like). The AI engines 116 may determine the next best action 126 of FIG. 1 by determining where a particular employee is on each of multiple distribution curves associated with the multiple goals and determining which distribution curve of the multiple distribution curves will result in the largest benefit for the particular employee. For example, assume an employee belongs to an organization that has set six goals. Based on the employee activity data 115 and metrics 122, a distribution curve is created for each of the six goals, thereby resulting in six distribution curves (e.g., one for each goal). A particular employee may be ranked above average 208 on two of the distribution curves, average 206 on three of the distribution curves, and below average 204 on a particular distribution curve. Because the particular employee is ranked below average on the particular distribution curve, the distance between the particular employee and the persona (e.g., an employee who is furthest to the right on the distribution curve) is greatest for the particular distribution curve. In this example, the AI engines 116 may select the next best action from the development plan based on the particular distribution curve with the intent of moving the particular employee from below average 204 two average 206 or above average 208, thereby improving the employee's scorecard 138 of FIG. 1.

Numerous studies have shown that developing the employees 108 that are in the average portion 206 yields higher performance as compared to developing the employees 108 that are in the below average portion 204. Thus, the employees 108 in the below average portion 204 may be redeployed or let go if they are not able to improve their performance after a predetermined number of next best actions. For example, if a particular employee is in the below average portion 204 and fails to move into the average portion 206 after three next best actions (e.g., nudge 210, training 212, coaching 214), then the particular employee may be let go. In addition, numerous other studies have shown that the higher the performer, the more frequently the high performer benefits from receiving positive reinforcement (e.g., recognition 216). Thus, the employees 108 in the above average portion 208 may frequently receive recognition 216 to keep their performance in the above average portion 208.

Because employee performance is determined at a first time interval (e.g., every week, every two weeks or the like), in some cases, individual employees' performance may be charted on the distribution curve for a current performance and one or more previous performances. For example, the distribution curve may show an individual employee's performance for X number of the first time interval (X>0), such as the individual employee's performance calculated every week for a second time interval, such as for the past one month, for the past one year, for year-to-date, or the like. In this way, a manager (e.g., a higher-level employee) can see over a longer time interval (e.g., the second time interval), the individual employee's week-over-week performance and visually determine whether the employee is progressing towards the right side of the distribution curve. In addition, the manager can visually determine an effectiveness of the development plan 124.

Thus, AI engines may analyze each employee's performance based on one or more distribution curves, with each distribution curve corresponding to a particular goal set by the enterprise. Based on each employee's location on the distribution curve, each employee may be classified into multiple categories, such as, for example, below average, average, and above average. The AI engines may identify which particular next best action produces the largest increase in performance for each employee and which particular next best action produces the largest increase in performance for employees in each portion of the distribution curve. The AI engines may predict, based on activity data and metrics, a development plan that includes a next best action. The next best action may be a distribution curve which the AI engines predict to have the maximum "bang for the buck", e.g., that are predicted to result in the largest improvement for each employee.

Figure 3:
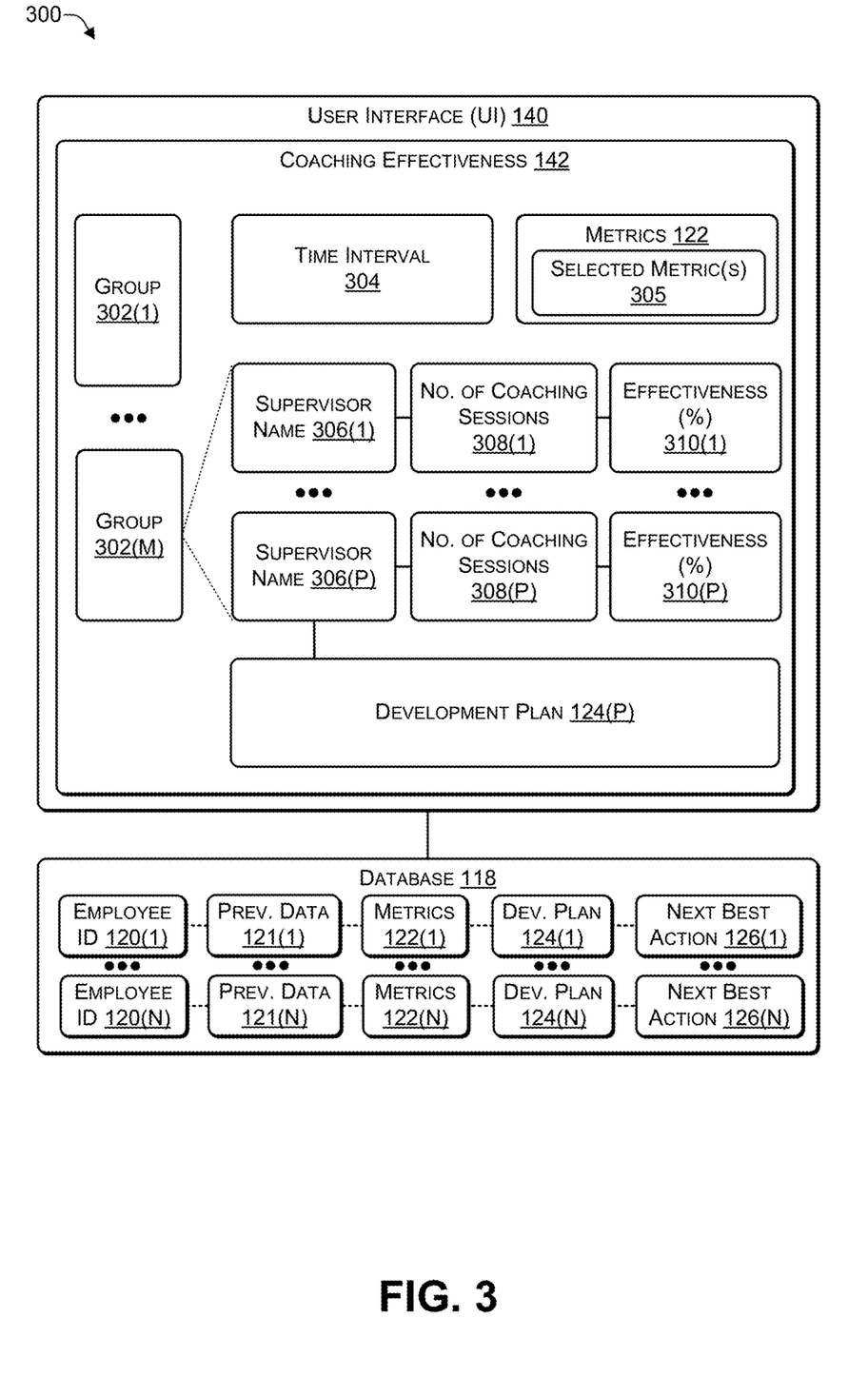
FIG. 3 is a block diagram illustrating a coaching effectiveness user interface (UI), according to some embodiments.

FIG. 3 is a block diagram 300 illustrating a coaching effectiveness user interface (UI), according to some embodiments. The coaching effectiveness 142 may display, to employees at a certain level (e.g., a coach or higher level) data from the database 118 associated with an effectiveness of individual coaches.

The server 104 provides the UI 140 that can be displayed on a computing device (e.g., one or more of the computing devices 102 of FIG. 1). An employee may login to the UI 140 using credentials (e.g., username and password). After authenticating the credentials, the UI 140 may provide an appropriate level of access to portions of data in the database 118. For example, in a hierarchical organization, a lowest level of the employees 108 may, after authentication, be unable to access the coaching effectiveness 142. In some cases, a supervisor of the lowest level employee may be unable to access data from the database 118 associated with coaching effectiveness 142, while in other cases the supervisor of the lowest level employee may be able to access data from the database 118 associated with coaching effectiveness 142. For example, in some cases, a particular supervisor may be able to view their own coaching effectiveness but not the coaching effectiveness of other coaches. In other cases, the particular supervisor may be able to view their own coaching effectiveness relative to other coaches. The supervisor or those at a level higher than the supervisor may, after having their credentials authenticated, be provided with access to the coaching effectiveness 142. The coaching effectiveness 142 may provide information regarding how effective each coach (e.g., supervisor) is with reference to coaching employees.

After opening the UI 140 and selecting the coaching effectiveness 142, the user may be provided with multiple groups 302(1) to 302(M) (M>0) from which to select. In some cases, the groups 302 may be employees grouped according to a department, a business unit, a line of business, or the like. In other cases, the groups 302 may be employees grouped according to a job function, such as customer service, marketing, product development, sales, and the like. The way in which employees are grouped may be created by each enterprise to suit their specific organizational structure. The user may select a particular group, such as the group 302(M), from the groups 302, to create a selected group 302(M). Selecting the group 302(M) may cause the UI 140 to display one or more supervisor names 306(1) to 306(P) (P>0), e.g., names of supervisors within the selected group 302(M). The user may select a particular supervisor name from the one or more supervisor names 306 to create a selected supervisor name 306.

The UI 140 may display a time interval 304, such as the second time interval (e.g., one week, one month, year to date, most recent quarter, a previous quarter, last one year, or the like). In some cases, the time interval 304 may be user selectable. For example, the UI 140 may provide a drop-down menu (a selection of the time intervals, or a way for the user to select a start date and an end date for the time interval) to enable the user to select a particular time interval. Thus, the user may, in some cases select the time interval 304 while in other cases the UI 140 may provide a predetermined time interval 304.

The UI 140 may display the multiple metrics 122 that are determined from the activity data 115 and the previous data 121 of FIG. 1. The user viewing the UI 140 may select one or more of the metrics to create selected metric(s) 305.

Based on the selected group 302, the selected supervisor name 306, the selected metric(s) 305, and the time interval 304, the UI 140 may display a number of coaching sessions 308 that the selected supervisor has performed in the time interval 304 for the selected metric(s) 305 and an effectiveness 310 associated with the number of coaching sessions 308. For example, the effectiveness 310 may be expressed as a percentage. If the selected supervisor name 306(P) has an effectiveness 310 below a predetermined threshold (e.g., less than 50% or the like), then the selected supervisor name 306(P) may be provided with the development plan 124(P) that includes improving the supervisor's coaching effectiveness. For example, the development plan 124(P) may include the nudge 210, training 212, recognition 216 (e.g., if the supervisor's coaching effectiveness is above a predetermined threshold), coaching from another supervisor (e.g., with a higher coaching effectiveness), sitting in on a coaching session to observe another supervisor (e.g., with a higher coaching effectiveness) when coaching an employee, or the like.

The coaching effectiveness 310 is a calculation that indicates how effective the coaching of the selected supervisor 306(P) is during the time interval 304. For example, the coaching effectiveness 310 measures a coach's ability to help others improve their performance with respect to one of the goals 134 of FIG. 1. In some cases, the effectiveness 310 may be a rank of the selected supervisor name 306(P) as compared to other supervisors in the selected group 302(M). For example, the coaching effectiveness 310 may be determined based on a total number of coaching sessions performed by the selected supervisor 306(P) in the time interval 304, such as, month to date, year to date, quarter to date, or another time interval.

For example, after a coach completes a coaching session (e.g., coaching 214 in the development plan 124) for the selected metric(s) 305 (e.g., one or more of the goals 134) associated with a particular employee 108, the employee's month-to-date (or other time interval) actual performance for the selected metrics 305 as of the date of coaching is recorded. After a particular time interval has elapsed, e.g., seven days later (e.g., day 8 from the date of coaching), if the employee's performance has improved for the selected metric(s) 305 for which the employee received coaching, then the coach's effectiveness 310 (e.g., score) increases. If the employee's performance for the selected metric(s) 305 stays the same or decreases, then there is a decrease in the coach's effectiveness 310 (e.g., score). The coaching effectiveness 310 may be determined based on the total number of positive coaching results divided by the total number of coaching sessions for coachable metrics. For example, supervisor John logs 10 total coaching sessions on the selected metric(s) 305 for 10 employees. On day eight (e.g., seven days after the date of coaching), 8 of the coaching sessions resulted in an improvement, one coaching session did not change the employee's performance, and one coaching session resulted in a decrease in the employee's performance. In this example, supervisor John's coaching effectiveness 310 is 80% because 8 of the 10 employees experienced an increase in performance (and 2 did not), e.g., 8 divided by 10=80% effectiveness 310.

In some cases, the enterprise may configure the coaching effectiveness 310 to take into account whether the selected metric(s) 305 met a particular goal or not. For example, if the coaching effectiveness 310 is configured to not take into account whether a particular goal was met, then the coaching effectiveness 310 is determined based on whether the employee that was coached improved or not after the coaching. In this example, the purpose of the effectiveness score 310 is to provide visibility to coaches that are coaching effectively, thereby enabling insight into best practices, and to provide visibility to coaches that are not driving performance improvement. As another example, if the coaching effectiveness 310 is configured to take into account whether a particular goal was met, then the coaching effectiveness 310 is determined based on whether the employee that was coached met the particular goal after the coaching. For example, if supervisor John coaches 10 employees and 7 employees meet or exceed a particular goal, then supervisor John has a 70% coaching effectiveness 310. Of course, the particular goal can be set in such a way that any increase in performance, e.g., performance P1 at time T1 is less than performance P2 at time T2 (T2>T1), results in the employee performance increase being counted when determining supervisor John's coaching effectiveness 310. Thus, the enterprise may, in some cases configure the coaching effectiveness 142 to take into account whether the employees that were coached achieved particular goals and in other cases take into account whether the coaching improved the employee's performance (e.g., without looking at whether particular goals were met).

If the supervisor 306 (e.g., coach) has performed zero coaching sessions in the time interval 304, then, in some cases, the UI 140 may display the effectiveness 310 for a previous time interval (e.g., previous month, previous, quarter, previous year, or the like). In other cases, the effectiveness 310 may display "N/A", "Not Applicable, "Insufficient data for selected time interval" or a similar indicator.

If an employee is coached but the metrics 122 for an employee are unavailable 7 or more days later (e.g., due to a system issue), then the effectiveness 310 may not be updated until the metrics 122 have been updated to determine an updated effectiveness 310. In some cases, the effectiveness 310 determines the effectiveness of any coaching conducted, regardless of to whom the employee reports. If one of the metrics 122, e.g., a key performance indicator (KPI), has not been reported then a previously determined effectiveness 310 may be displayed until the latest data is received and the most recent effectiveness 310 is determined. The metrics 122 that an enterprise has designated as coachable may be used to determine coaching effectiveness 310.

Figure 4:
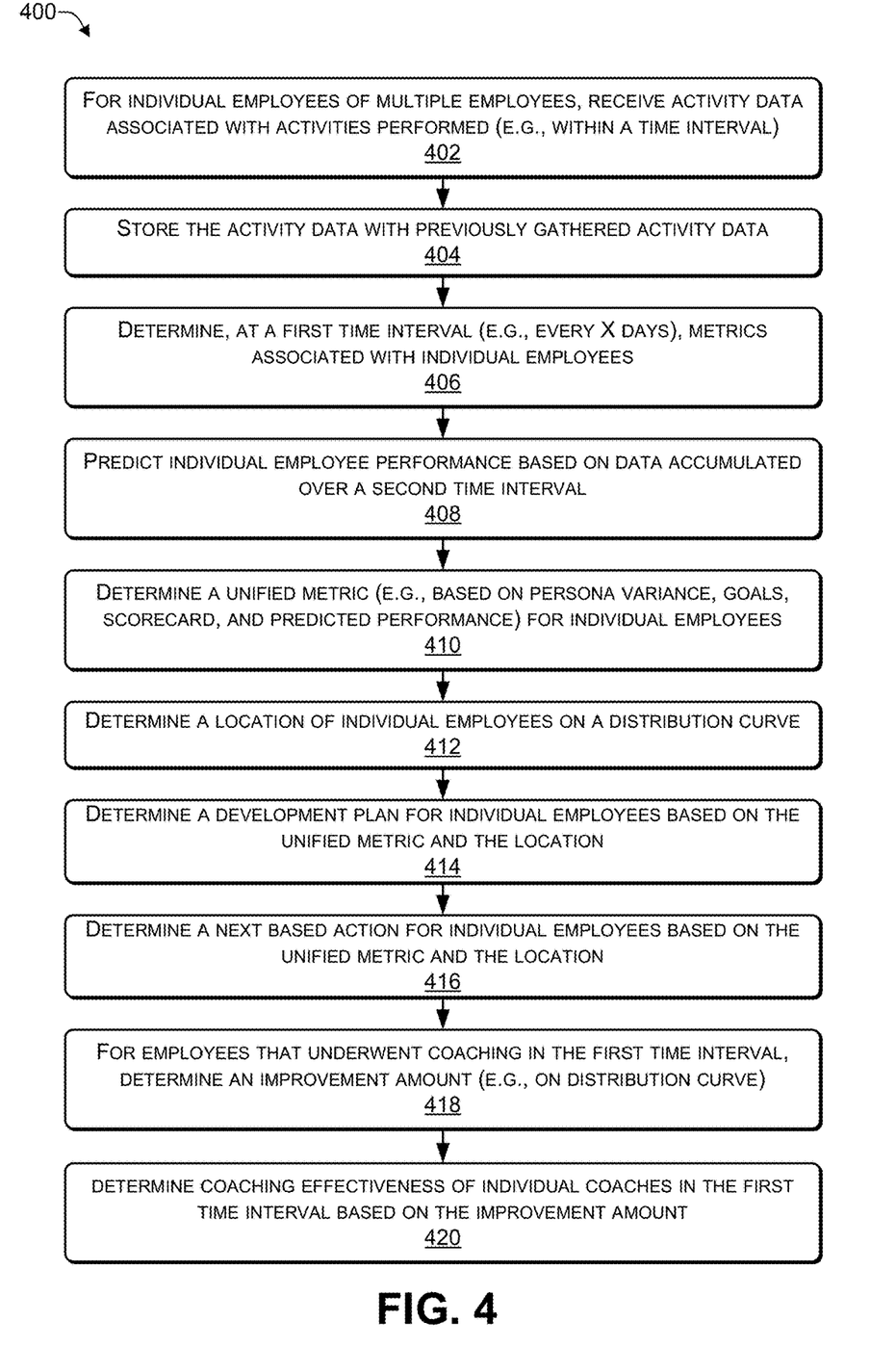
FIG. 4 is a flowchart of a process that includes determining a coaching effectiveness of individual coaches, according to some embodiments.
Figure 5:
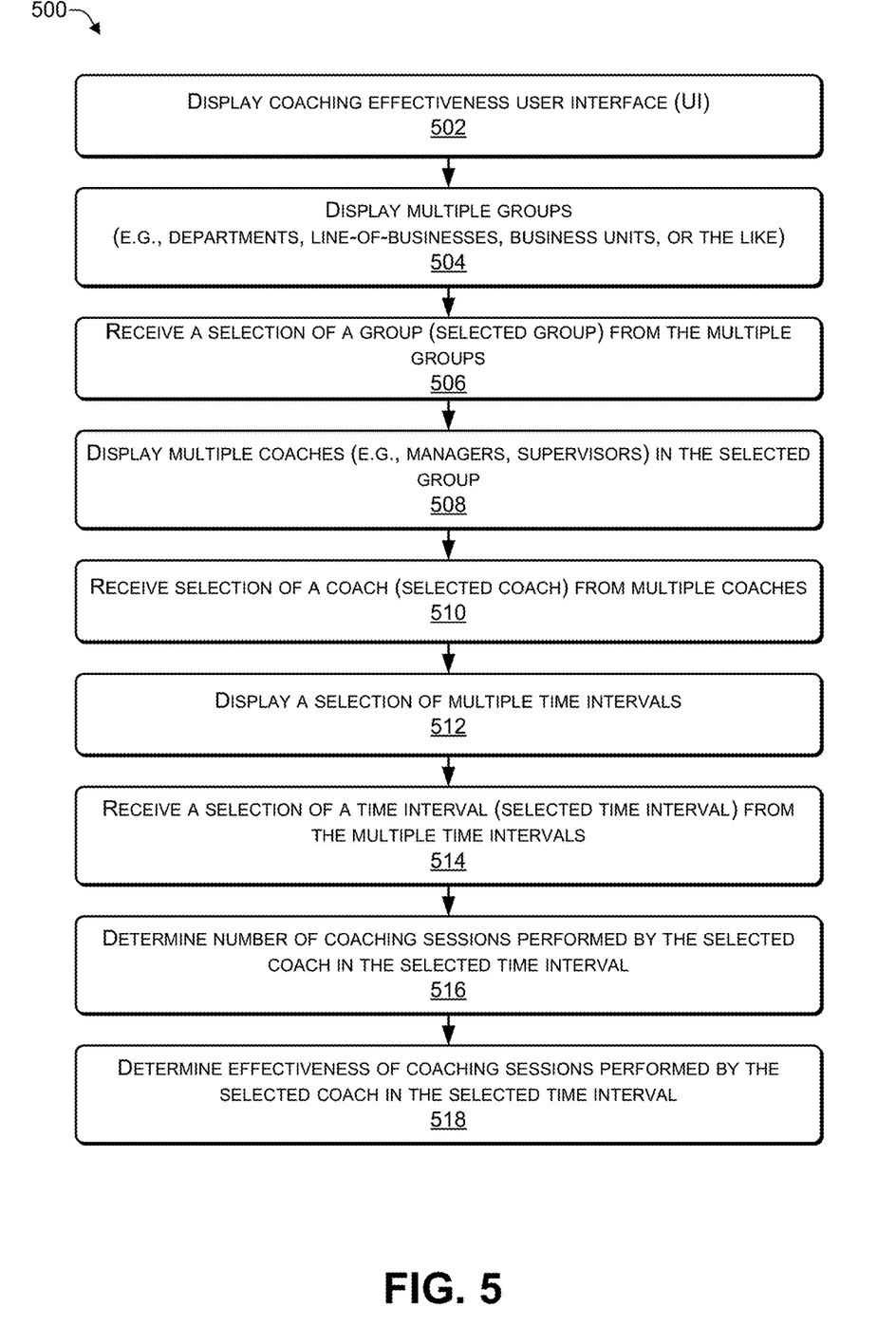
FIG. 5 is a flowchart of a process to determine an effectiveness of coaching sessions performed by a coach in a selected time period, according to some embodiments.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3 as described above, although other models, frameworks, systems and environments may be used to implement this process.

FIG. 4 is a flowchart of a process 400 that includes determining a next best action for individual employees, according to some embodiments. The process 400 may be performed by one or more components (e.g., the AI engines 116) of the server 104 of FIG. 1.

At 402, the server may receive, for individual employees of multiple employees, activity data associated with activities performed (e.g., by the individual employees) within a time interval. At 404, the server may store the activity data with previously gathered activity data. At 406, the server may determine, at a first time interval, metrics associated with individual employees. For example, in FIG. 1, the server 104 may receive the activity data 115 from each of the computing devices 102. The activity data 115 may include actions 110 performed by each of the employees 108 on their corresponding computing device 102 within a particular time period (e.g., D days, D>0, such as one day, one week, two weeks, one month, or the like). The server 104 may store the activity data 115 in the database 118 and use the AI engines 116 to determine various metrics 122. For example, the server 104 may receive the activity data 115 on the close of business on a particular day of the week (e.g., each Friday). The activity data 115 may include activities performed within a particular time interval (e.g., one week, two weeks, one month, or the like). The server may determine the metrics 122 to enable the development plan 120 for the next best action 126 to be determined for the following week.

At 408, the server may predict individual employee performance based on data accumulated over a second time interval. For example, in FIG. 1, the server 104 may receive the activity data 115 accumulated over a first time interval (e.g., one week). The server 104 may determine a portion of the metrics 122 over a second time interval (e.g., two weeks, one month, or the like) and make the prediction 136 based on the portion of the metrics 122 over the second time interval.

At 410, the server may determine a unified metric (e.g., based on persona variance, goals, scorecard and predicted performance) for individual employees. For example, in FIG. 1, the server 104 may determine the unified metric 128 based on the portion of the metrics 122 associated with the second time interval. In this way, the unified metric 128 may be determined based on activity data in a sliding window with the length equal to the second time interval (e.g., the last 1 month of activity data).

At 412, the server may determine a location of individual employees on a distribution curve (e.g., created based on data associated with the multiple employees). For example, the server 104 of FIG. 1 may plot the unified metric 128 associated with individual ones of the employees 108 to determine the distribution curve 202 and determine a location of individual employees 108 on the distribution curve 202. The distribution curve 202 based on the unified metric 128 may identify how individual employees are performing relative to their peers.

At 414, the server may determine a development plan for individual employees based on the unified metric and the location of individual employees on the distribution curve. For example, in FIG. 2, the development plan 124 associated with an individual employee 108 may be based on a location of the individual employee 108 on the distribution curve 202.

At 416, the server may determine a next best action for individual employees based on the unified metric and the location of individual employees on the distribution curve. For example, in FIG. 2, the unified metric 128 of FIG. 1 and the location of an individual and ploidy 108 on the distribution curve 202 may be used to determine the next best action 126. For example, the AI engines 116 may use the unified metric 128 to identify a subset of employees 108 whose performance can be improved, such as those in the average portion 206. The AI engines 116 may analyze the subset of the employees 108 by determining the persona variance 132 for each of the employees for each of the goals 134. The AI engines 116 may identify the next best action 126 by identifying the largest persona variance 132 for each of the employees for each of the goals 134. For example, a particular employee may be in the average portion 206 for S of T goals (0<S<T) and in the below average portion 204 for the remaining goals (e.g., T-S). In this example, the remaining goals having the largest persona variance 132 may be selected and an appropriate next best action determined.

At 418, for employees that underwent coaching in the first time interval, the process may determine an improvement amount (e.g., relative to the distribution curve) for the metric for which they were coached. At 420, the process may determine a coaching effectiveness of individual coaches in the first time interval based on the improvement amount for each employee that was coached. For example, in FIGS. 1 and 3, the metrics 122 associated with each employee having the employee ID 120 may include an improvement amount for each of the metrics 122 four which the employee received coaching. The improvement in performance for which the employee received coaching may be used to determine the effectiveness 310 of the supervisor 306 that provided the coaching as described in FIG. 3.

Thus, a server may receive activity data from computing devices identifying which activities employees have engaged in over a first time interval (e.g., one week). The server may add the activity data to previously received activity data and determine metrics for each employee over a second time interval that is longer than the first time interval (e.g., one month). The server may use one or more AI engines to determine a unified metric, create a distribution curve that includes the unified metric for all employees in a peer group, and determine which group (e.g., below average, average, above average) each employee is located on the distribution curve. Based on the employee's location and unified metric, the AI engines may determine a next best action associated with each employee. For example, below average employees may be provided with the nudge or with training to move them higher on the distribution curve. Average employees may be provided with coaching, training, recognition or any combination thereof to move them higher on the distribution curve. Above average employees may receive recognition (e.g., positive reinforcement), training, or both to keep them above average or move them higher on the above average portion of the distribution curve. For employees that have undergone coaching for a particular metric, the system determines whether the employees' performance improved. The system determines a coaching effectiveness associated with each coach (e.g., supervisor) that performed coaching in a particular time period.

FIG. 5 is a flowchart of a process 500 to determine an effectiveness of coaching sessions performed by a coach in a selected time period, according to some embodiments. The process 500 may be performed by one or more software components of the server 104 of FIG. 1.

At 502, the process may display a coaching effectiveness portion of a user interface (UI). For example, in FIG. 3, the server 104 may display the coaching effectiveness 142 portion of the UI 140.

At 504, the process may display multiple groups (e.g., employees grouped together based on inclusion in a same department, line of business, business unit, job function, or the like). At 506, the process may receive a selection of a group (creating a selected group) from the multiple groups. For example, in FIG. 3, the coaching effectiveness 142 may display the groups 302(1) to 302(M) and receive a selection of a particular group, such as the group 302(M), to create a selected group.

At 508, the process may display multiple coaches, such as managers, supervisors or the like, belonging to the selected group. At 512, the process may display a selection of multiple time intervals. At 514, the process may receive a selection of a time interval (creating a selected time interval) from the multiple time intervals. For example, in FIG. 3, the coaching effectiveness 142 may display the supervisor names 306(1) to 306(P) belonging to the selected group 302(M). In some cases, the coaching effectiveness 142 may receive a selection of the time interval 304 (e.g., week, month, quarter, year to date, year, or the like).

At 516, the process may determine the number of coaching sessions performed by the selected coach in the selected time interval. In some cases, the number of coaching sessions performed by the selected coach in the selected time interval may be with respect to a user selected metric. At 518, the process may determine and display an effectiveness of the coaching sessions performed by the selected coach in the selected time interval. For example, in FIG. 3, the coaching effectiveness 142 may display the number of coaching sessions 308(P) associated with the selected coach (e.g., supervisor name 306(P)) and the effectiveness 310(P) of the coaching provided by the selected coach. In some cases, the user may select one or more of the metrics 122, to create the selected metrics 305, and the number of coaching sessions 308 and the effectiveness 310 may be determined with respect to the selected metrics 305. In other cases, the coaching effectiveness 142 may display the number of coaching sessions 308 and the effectiveness 310 with respect to all of the coachable metrics 122.

Thus, a user interface may enable a coach (or someone higher in the organization then the coach) to view the effectiveness of coaching provided by individual coaches in a particular time interval. In this way, the organization can identify the supervisors that are providing excellent coaching and use them to train other supervisors to achieve similar results. For example, an experienced supervisor who consistently achieves an effectiveness of 80% or higher and may be asked to train less experience supervisors. In addition, by identifying supervisors that are not achieving good results with their coaching (e.g., coaching effectiveness 310 less than a particular percentage, such as 60%, 50%, or the like) and providing them with the development plan 124, individual supervisor's coaching effectiveness may be improved.

Figure 6:
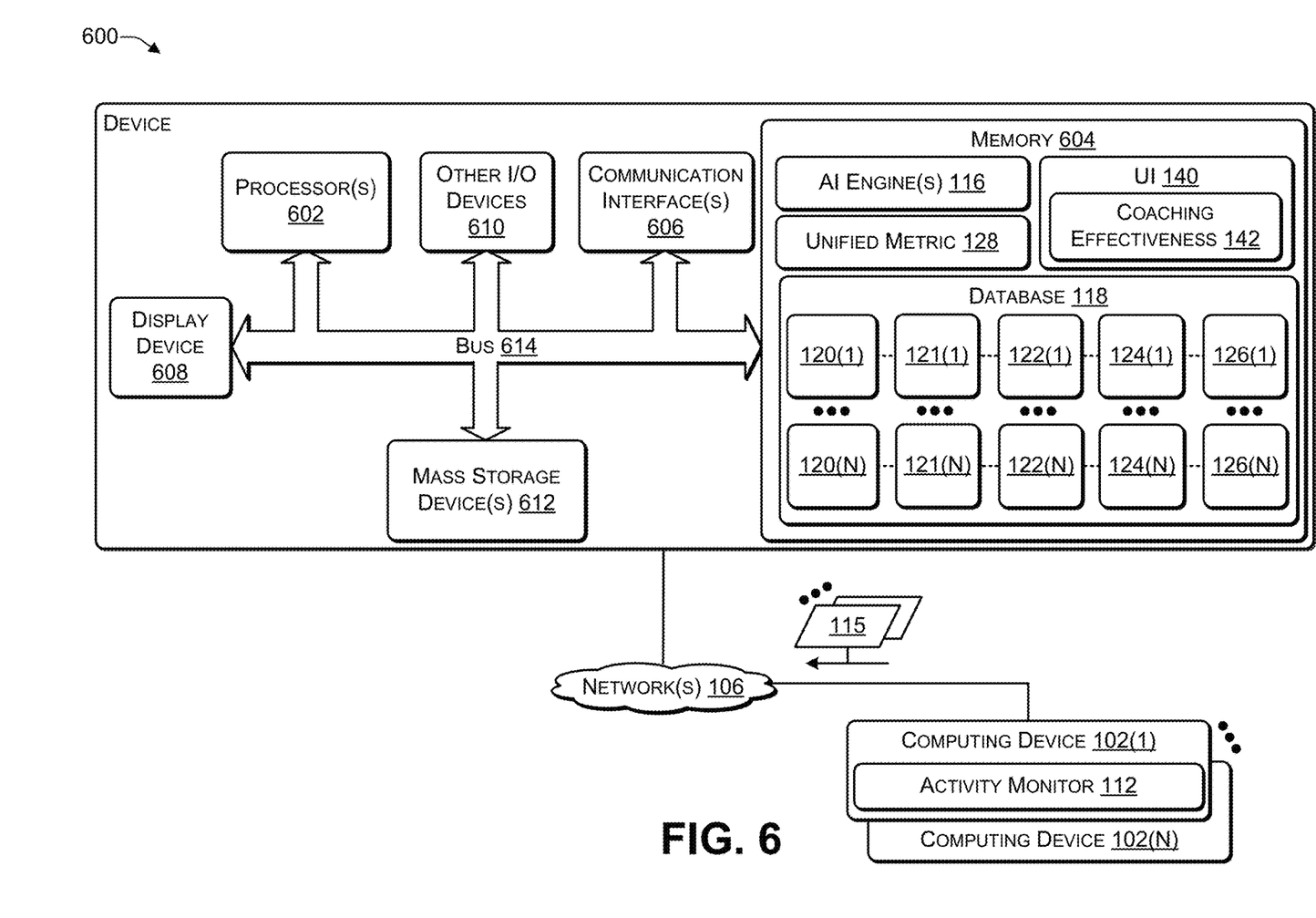
FIG. 6 illustrates an example configuration of a computing device that can be used to implement the systems and techniques described herein.

FIG. 6 illustrates an example configuration of a device 600 that can be used to implement the systems and techniques described herein, such as, for example, the computing devices 102, and/or the server 104 of FIG. 1. For illustration purposes, the device 600 is illustrated in FIG. 6 as implementing the server 104 of FIG. 1.

The device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 108. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data, including, for example, the AI engines 116, the unified metric 128, the database 118, and the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising: determining, by one or more processors and based on a portion of aggregated data, a plurality of metrics associated with an employee, the aggregated data including activities performed by the employee using a computing device; training individual artificial intelligence engines of a plurality of artificial intelligence engines using the plurality of metrics to create a plurality of trained artificial intelligence engines; determining, by the one or more processors and based on the plurality of metrics, a first unified metric associated with the employee; creating, by the one or more processors, a distribution curve based on the first unified metric associated with the employee and based on additional unified metrics associated with additional employees; determining, by the one or more processors, a location of the employee on the distribution curve; predicting a next best action for the employee, by the plurality of trained artificial intelligence engines being executed by the one or more processors based on the location of the employee on the distribution curve; based on determining that the next best action comprises coaching, determining that a coaching session between the employee and a coach took place; determining, a predetermined time interval after the coaching session, additional metrics associated with the employee; retraining at least one trained artificial intelligence engine of the plurality of trained artificial intelligence engines based on the additional metrics; predicting, by at least one retrained artificial intelligence engine and based at least in part on the additional metrics, a predicted performance associated with the employee; determining, after the predetermined time interval, a second unified metric associated with the employee; and based at least in part on determining that the second unified metric is greater than the first unified metric: determining that the coaching session was successful; and increasing a coaching effectiveness metric associated with the coach.

2. The method of claim 1, wherein:
   the coaching effectiveness metric is determined by dividing:
      a number of successful coaching sessions, with
      a total number of coaching sessions performed by the coach in the predetermined time interval.

3. The method of claim 1, further comprising:
   based at least in part on determining that the second unified metric is less than or equal to the first unified metric:
      determining that the coaching session was unsuccessful; and
      decreasing a coaching effectiveness metric associated with the coach.

4. The method of claim 1, further comprising:
   displaying a user interface;
   displaying a plurality of groups;
   based at least in part on receiving a selection of a particular group of the plurality of groups, displaying a plurality of coaches belonging to the particular group; and
   based at least in part on receiving a selection of a particular coach of the plurality of coaches, displaying a coaching effectiveness metric associated with the particular coach.

5. The method of claim 4, further comprising:
   displaying a plurality of time intervals;
   receiving a selection of a particular time interval of the plurality of time intervals; and determining the coaching effectiveness metric associated with the particular coach for the particular time interval.

6. The method of claim 1, further comprising:
predicting, by the plurality artificial intelligence engines, a coaching next best action for the coach.

7. The method of claim 6, wherein the coaching next best action comprises one of:
providing a nudge to the coach;
scheduling training for the coach;
scheduling coaching to the coach; or
providing recognition to the coach.

8. A server comprising: one or more processors; and one or more non-transitory computer readable media storing instructions executable by the one or more processors to perform operations comprising: determining, based on a portion of aggregated data, a plurality of metrics associated with an employee, the aggregated data including activities performed by the employee using a computing device; training individual artificial intelligence engines of a plurality of artificial intelligence engines using the plurality of metrics to create a plurality of trained artificial intelligence engines; determining, based on the plurality of metrics, a first unified metric associated with the employee; creating a distribution curve based on the first unified metric associated with the employee and based on additional unified metrics associated with additional employees; determining a location of the employee on the distribution curve; predicting a next best action for the employee, by the plurality of trained artificial intelligence engines based on the location of the employee on the distribution curve; based on determining that the next best action comprises coaching, determining that a coaching session between the employee and a coach took place; determining, a predetermined time interval after the coaching session, additional metrics associated with the employee; retraining at least one trained artificial intelligence engine of the plurality of trained artificial intelligence engines based on the additional metrics; predicting, by at least one retrained artificial intelligence engine and based at least in part on the additional metrics, a predicted performance associated with the employee; determining, after the predetermined time interval, a second unified metric associated with the employee; and based at least in part on determining that the second unified metric is greater than the first unified metric: determining that the coaching session was successful; and increasing a coaching effectiveness metric associated with the coach.

9. The server of claim 8, wherein:
the coaching effectiveness metric is determined by dividing:
a number of successful coaching sessions, with
a total number of coaching sessions performed by the coach in the predetermined time interval.

10. The server of claim 8, the operations further comprising:
based at least in part on determining that the second unified metric is less than or equal to
the first unified metric:
determining that the coaching session was unsuccessful; and
decreasing a coaching effectiveness metric associated with the coach.

11. The server of claim 8, the operations further comprising:
displaying a user interface;
displaying a plurality of groups;
based at least in part on receiving a selection of a particular group of the plurality of groups, displaying a plurality of coaches belonging to the particular group; and
based at least in part on receiving a selection of a particular coach of the plurality of coaches, displaying a coaching effectiveness metric associated with the particular coach.

12. The server of claim 11, the operations further comprising:
displaying a plurality of time intervals;
receiving a selection of a particular time interval of the plurality of time intervals; and
determining the coaching effectiveness metric associated with the particular coach for the particular time interval.

13. The server of claim 8, the operations further comprising:
predicting, by the plurality artificial intelligence engines, a coaching next best action for the coach.

14. The server of claim 13, wherein the coaching next best action comprises one of:
providing a nudge to the coach;
scheduling training for the coach;
scheduling coaching to the coach; or
providing recognition to the coach.

15. A memory device to store instructions executable by one or more processors to perform operations comprising: determining, based on a portion of aggregated data, a plurality of metrics associated with an employee, the aggregated data including activities performed by the employee using a computing device; training individual artificial intelligence engines of a plurality of artificial intelligence engines using the plurality of metrics to create a plurality of trained artificial intelligence engines; determining, based on the plurality of metrics, a first unified metric associated with the employee; creating a distribution curve based on the first unified metric associated with the employee and based on additional unified metrics associated with additional employees; determining a location of the employee on the distribution curve; predicting a next best action for the employee, by the plurality of trained artificial intelligence engines based on the location of the employee on the distribution curve; based on determining that the next best action comprises coaching, determining that a coaching session between the employee and a coach took place on a particular date; determining, a predetermined time interval after the coaching session, additional metrics associated with the employee; retraining at least one trained artificial intelligence engine of the plurality of trained artificial intelligence engines based on the additional metrics; predicting, by at least one retrained artificial intelligence engine and based at least in part on the additional metrics, a predicted performance associated with the employee; determining, after the predetermined time interval, a second unified metric associated with the employee; and based at least in part on determining that the second unified metric is greater than the first unified metric: determining that the coaching session was successful; and increasing a coaching effectiveness metric associated with the coach.

16. The memory device of claim 15, wherein:
the coaching effectiveness metric is determined by dividing:
a number of successful coaching sessions, with
a total number of coaching sessions performed by the coach in the predetermined time interval.

17. The memory device of claim 15, the operations further comprising:
- based at least in part on determining that the second unified metric is less than or equal to the first unified metric:
  - determining that the coaching session was unsuccessful; and
- decreasing a coaching effectiveness metric associated with the coach.

18. The memory device of claim 15, the operations further comprising:
- displaying a user interface;
- displaying a plurality of groups;
- based at least in part on receiving a selection of a particular group of the plurality of groups, displaying a plurality of coaches belonging to the particular group; and
- based at least in part on receiving a selection of a particular coach of the plurality of coaches, displaying a coaching effectiveness metric associated with the particular coach.

19. The memory device of claim 18, the operations further comprising:
- displaying a plurality of time intervals;
- receiving a selection of a particular time interval of the plurality of time intervals; and
- determining the coaching effectiveness metric associated with the particular coach for the particular time interval.

20. The memory device of claim 15, the operations further comprising:
- predicting, by the plurality artificial intelligence engines, a coaching next best action for the coach, wherein the coaching next best action comprises one of:
  - providing a nudge to the coach;
  - scheduling training for the coach;
  - scheduling coaching to the coach; or
  - providing recognition to the coach.

* * * * *